(12) United States Patent
Barenbrügge et al.

(10) Patent No.: US 10,151,213 B2
(45) Date of Patent: Dec. 11, 2018

(54) STATE OBSERVER FOR A STEAM GENERATOR OF A THERMAL POWER PLANT

(71) Applicant: SIEMENS AKTIENGESELLSCHAFT, München (DE)

(72) Inventors: Annette Barenbrügge, Frankfurt (DE); Fabian Bargiel, Karlsruhe (DE); Lutz Hanel, Stuttgart (DE); Bernhard Meerbeck, Kelkheim (DE); Michael Treuer, Lorch (DE); Klaus Wendelberger, St. Leon-Rot (DE)

(73) Assignee: Siemens Aktiengesellschaft (DE)

( * ) Notice: Subject to any disclaimer, the term of this patent is extended or adjusted under 35 U.S.C. 154(b) by 289 days.

(21) Appl. No.: 14/660,984

(22) Filed: Mar. 18, 2015

(65) Prior Publication Data

US 2015/0275688 A1 Oct. 1, 2015

(30) Foreign Application Priority Data

Mar. 26, 2014 (DE) ........................ 10 2014 205 627

(51) Int. Cl.
*G01M 19/00* (2006.01)
*F01D 21/00* (2006.01)
*G01M 15/14* (2006.01)
*F01K 5/02* (2006.01)

(52) U.S. Cl.
CPC .............. *F01D 21/003* (2013.01); *F01K 5/02* (2013.01); *G01M 15/14* (2013.01)

(58) Field of Classification Search
None
See application file for complete search history.

(56) References Cited

U.S. PATENT DOCUMENTS

| | | | |
|---|---|---|---|
| 4,558,227 A | 12/1985 | Honda | |
| 5,991,525 A | 11/1999 | Pandey | |
| 6,393,075 B1 | 5/2002 | Xu | |
| 7,401,577 B2 | 7/2008 | Marin | |
| 10,012,114 B2* | 7/2018 | Wendelberger | ......... F01K 13/02 |
| 2007/0156288 A1 | 7/2007 | Piche | |
| 2012/0072045 A1 | 3/2012 | Rupp | |

(Continued)

FOREIGN PATENT DOCUMENTS

| | | |
|---|---|---|
| CN | 102679314 A | 9/2012 |
| CN | 102734783 A | 10/2012 |
| CN | 103322553 A | 9/2013 |

OTHER PUBLICATIONS

Chinese Office Action Dated July 20, 2016; Application No. 2015101349654; 11 Pgs.

*Primary Examiner* — Eric S McCall
(74) *Attorney, Agent, or Firm* — Schmeiser, Olsen, & Watts LLP

(57) ABSTRACT

A state observer for a steam generator of a thermal power plant is provided. Accordingly, provision is made for the state observer to be a multi-variable state observer which has a Kalman filter designed for linear-quadratic state feedback. The state observer can be used for validating measured variables of the steam generator of the thermal power plant, wherein measured variables of the steam generator are compared with output variables of the state observer.

8 Claims, 8 Drawing Sheets

(56) References Cited

U.S. PATENT DOCUMENTS

| | | | |
|---|---|---|---|
| 2012/0226474 A1* | 9/2012 | Trejo Sanchez | G05B 23/0275 702/179 |
| 2013/0133751 A1* | 5/2013 | Backi | F01K 13/00 137/11 |
| 2014/0309798 A1* | 10/2014 | Wendelberger | F01K 21/00 700/287 |
| 2015/0276209 A1* | 10/2015 | Barenbrugge | F22B 35/104 122/449 |

* cited by examiner

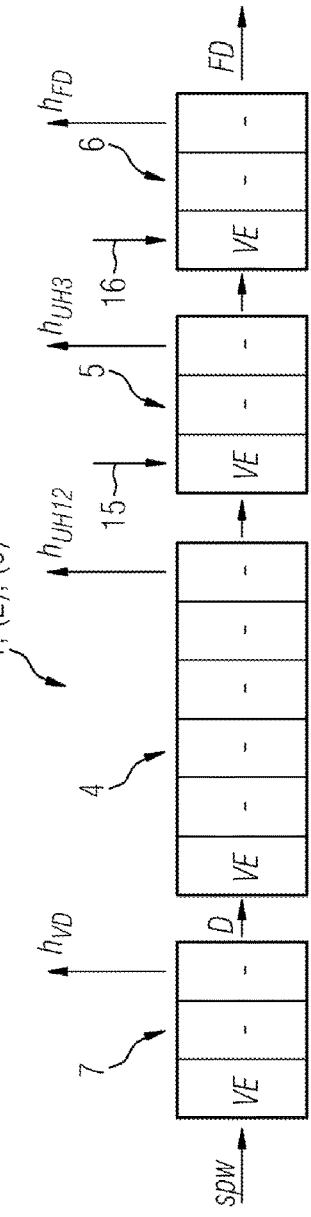
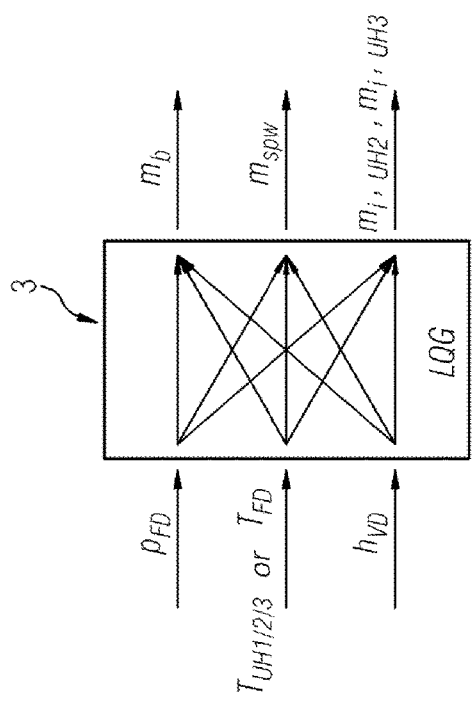
FIG 1
FIG 2

FIG 6

| Variable | Unit | Dimensions | Description |
|---|---|---|---|
| $\dot{Q}_n$ | [kJ/s] | n | Observed heat flows |
| $h_{FD, reference}$ | [kJ/kgK] | 1 | Fresh steam enthalpy reference value |
| $h_{measured}$ | [kJ/kgK] | Number of temperature measuring points | Enthalpy values at the measurement points |
| $\dot{m}_b$ | [p.u.] | 1 | Normalized fuel mass flow |
| $\dot{m}_{Einsp}$ | [kg/s] | i-1 | Observed injection mass flows |
| $\dot{m}_{Einsp, reference}$ | [kg/s] | i-1 | Reference values of the injection mass flows |
| $\dot{m}_{FD}$ | [kg/s] | 1 | Fresh steam mass flow |
| $\dot{m}_{FD, reference}$ | [kg/s] | 1 | Fresh steam mass flow reference value |
| $\dot{m}_{SpW}$ | [kg/s] | 1 | Feedwater mass flow |
| $p_{FD, reference}$ | [bar] | 1 | Fresh steam pressure refence value |
| $p_{measured}$ | [bar] | 1 | Pressure |
| $T_{FD, reference}$ | [°C] | 1 | Reference value of the fresh steam temperature |
| $U_{closed-loop\ control}$ | - | 1+i | Closed-loop control portion of the manipulated variables |
| $U_{open-loop\ control}$ | - | 1+i | Open-loop control portion of the manipulated variables |
| $x_{obs}$ | - | 3+1+n | Observed state variables |
| $x_{reference}$ | - | 3+1+n | Reference state values |
| $\varepsilon$ | - | 3+1+n | Control error |

STATE OBSERVER FOR A STEAM GENERATOR OF A THERMAL POWER PLANT

CROSS-REFERENCE TO RELATED APPLICATIONS

This application claims priority to DE 102014205627.6 having a filing date of Mar. 26, 2014, the entire contents of which are hereby incorporated by reference.

FIELD OF TECHNOLOGY

The following relates to a state observer for a steam generator of a thermal power plant.

BACKGROUND

A thermal power plant is a type of a power plant for generating power from fossil fuels, in which thermal energy of steam is converted into kinetic energy, usually in a multi-part steam turbine, and, furthermore, converted into electrical energy in a generator.

In such a thermal power plant, a fuel, e.g. coal, is burned in a combustion chamber, releasing heat.

The heat released thereby is taken up by a steam generator, i.e. a power plant boiler, consisting of an evaporator (part), abbreviated to evaporator, and an (optionally multi-stage) superheater (part), abbreviated to superheater.

In the steam evaporator, previously purified and prepared (feed) water, fed therein, is converted into steam/high-pressure steam.

By further heating of the steam/high-pressure steam in the superheater, the steam is brought to the temperature necessary for the "consumer", wherein temperature and specific volume of the steam increase. The steam is superheated by guiding the steam in a number of stages through heated tube bundles—the so-called superheater stages.

The high-pressure (fresh) steam generated thus then enters a—usually multi-part—steam turbine in the thermal power plant and there it performs mechanical work while expanding and cooling.

For the purposes of closed-loop control of thermal power plants, i.e. for closed-loop control there of (physical) state variables, such as temperature or pressure, of the feedwater or the (fresh) steam, it is known to provide for each control task, as a matter of principle, a single and uniquely assigned controller (single-variable state controller/closed-loop control; single input single output controller/control loop (SISO)).

By way of example, such a (single variable state) control of the steam temperature (controlled variable) in a thermal power plant is brought about by injecting water (manipulated variable) into the steam line upstream of the steam generator or upstream of the evaporator and the superheater stages by means of corresponding injection valves of an injection cooler. A (further) (single variable state) control of the steam pressure (controlled variable) in the thermal power plant is brought about, for example, by feeding fuel/a fuel mass flow rate (manipulated variable) into the combustion chamber of the steam generator.

EP 2 244 011 A1 has disclosed such a (single variable) state control of the steam temperature (with the injection mass flow rate as manipulated variable) in a thermal power plant.

This (single variable) state control in EP 2 244 011 A1 provides a linear quadratic regulator (LQR).

The LQR is a state controller, the parameters of which are determined in such a way that a quality criterion for the control quality is optimized.

Here, the quality criterion for linear quadratic closed-loop control also considers the relationship of the variables: the manipulated variable u and the controlled variable y. Here, the priorities can be determined by the $Q_y$ and R matrices. The quality value J is determined according to:

$$J(x_0, u(t)) = \int_0^\infty (y'(t) Q_y y(t) + u'(t) R u(t)) dt.$$

The static optimization problem in this respect, which is solved by the linear quadratic closed-loop control, is as follows (with K as controller matrix and $x_0$ as initial state):

$$\min_{u(t)} J(x_0, u(t)) = \min_{u(t)=-Kx(t)} J(x_0, u(t)) = \min_K J(x_0, -Kx(t)).$$

Furthermore, the practice of estimating state variables, such as steam states/temperatures in the superheater, which are used in a (single variable) state control but are not measurable, using an observer circuit or using an observer (state observer) is known.

In EP 2 244 011 A1, a Kalman filter, which is likewise designed according to the LQR principle, is used as an observer for such non-measurable steam states/temperatures in the superheater of the thermal power plant. The interaction between the LQR and the Kalman filter is referred to as an LQG (linear quadratic Gaussian) algorithm.

However, the LQG method employed—according to EP 2 244 011 A1—relates to a linear control problem, whereas the injection rate of mass flow as a manipulated variable of the (single variable) state control acts on the controlled variable temperature in a nonlinear manner.

As a result of a systematic conversion of all temperature measured values and temperature reference values to enthalpies—which is furthermore also provided in EP 2 244 011 A1—a linearization of the control problem is achieved since there is a linear relationship between the injection rate of mass flow and the steam enthalpy.

Here, the conversion—from temperature to enthalpy—is brought about with the aid of corresponding water/steam table relationships using a measured steam pressure.

The calculation of a feedback matrix in the state controller (controller matrix) is brought about in a continuously online manner in EP 2 244 011 A1, using the respectively current measured values, as is also the case for the corresponding feedback matrix in the observer (observer matrix), which is set up accordingly according to the LQR principle of the state controller, by means of which observer the controller is ultimately represented.

As a result, the controller in EP 2 244 011 A1 continuously adapts to the actual operating conditions of the thermal power plant. By way of example, a load-dependent change in the dynamic superheater behavior is automatically accounted for thereby.

The robustness of the closed-loop control algorithm is thus increased in EP 2 244 011 A1 by this online calculation of the feedback matrix.

Disturbances that have a direct effect on the superheater are expressed by the fact that a heat-up range, i.e. a ratio of the enthalpies between superheater output and superheater input, is modified.

Therefore, EP 2 244 011 A1 provides not only for estimating the states or the temperatures along the superheater (state observer) but also for additionally defining the disturbance or disturbance variable as a further state and estimating the latter with the aid of the observer (disturbance variable observer).

Consequently, a very quick, accurate and simultaneously robust reaction to corresponding disturbances is possible.

Since this control algorithm according to EP 2 244 011 A1 is very robust as a result of the described measures (linearization, online calculation, disturbance variable estimation), only very few parameters need to be set when putting a thermal power plant into operation.

Startup time and complexity are therefore significantly reduced.

However, since the plurality of (but single) control loops of the individual (single variable) state controls—like, for example, in the thermal power plant—are coupled to one another by means of a common controlled system, such as the steam generator, there necessarily is mutual influencing of the individual controllers.

By way of example, the closed-loop control of the pressure in the combustion chamber of the thermal power plant by way of a suction draft is strongly influenced by the closed-loop control of a fresh-air supply via the fresh air fan of the thermal power plant. Furthermore, an increased fuel rate of mass flow in the thermal power plant results in not only an increased production of steam, but also influences the steam temperature in the thermal power plant, which steam temperature is intended to be kept constant with the aid of injections. Additionally, the closed-loop control of the feedwater rate of mass flow with the aid of the feed pump and the regulation of the feedwater pressure with the aid of the feedwater control valve are dependent on one another.

One approach for taking into account such occurring cross-influences or such couplings between the individual closed-loop controls lies in targeted taking account of the couplings and the targeted application thereof.

From a control engineering point of view, this is brought about by the use of so-called decoupling networks with decoupling branches in the closed-loop control structures or between the control loops A design, i.e. a parameterization, of the decoupling branches is dependent on an actual dynamic process behavior of the considered systems and must be performed during the startup of the (power plant) closed-loop control.

During the parameterization, plant trials are performed and measured values are established in the plant (in the process). Evaluating the trial results or the measured values then provides information in respect of which parameters are to be modified to what extent. The parameters are then adjusted manually until the closed-loop control achieves the best-possible decoupling. A further, different approach for taking into account the occurring cross-influences between the individual controllers/closed-loop controls lies in the use of multi-variable controllers, in which a plurality of state variables are regulated simultaneously (multiple input multiple output controller/control loop (MIMO)).

Here too, a design, i.e. a parameterization, of such a multi-variable state controller is dependent on an actual dynamic process behavior of the considered system.

Thus, plant trials/tests are also carried out here and measured values of the plant are established (in the process), by means of which transfer functions between the (plurality of) input variables and the plurality of output variables and, possibly, the (plurality of) disturbance variables in the multi-variable state controller are established.

Independently of whether single closed-loop controls used for the closed-loop control problem of such a system/plant are decoupled or whether a multi-variable state controller is designed, plant trials/tests and the measured values of the plant established thereby are necessary for setting the controller or controllers.

However, if such (real) plant measured values are subject to measurement inaccuracies (or can only be measured with difficulty or not at all), a controller quality also depends on the quality of the measured values (or the availability thereof).

Therefore, a validation of measured data in this respect is helpful for designing a controller for closed-loop control of a plant/process, such as of the thermal power plant or the steam generator in the thermal power plant.

SUMMARY

An aspect relates to enabling validation of measurement data, used in particular for generating a controller for closed-loop control of a thermal power plant or of a steam generator of a thermal power plant.

This aspect is achieved by a state observer for a thermal power plant, in particular for a steam generator of a thermal power plant, in accordance with the independent patent claim.

Embodiments of the invention and the described developments can be implemented both in software and in hardware, for example by using a special electrical circuit or a (computation) module.

Furthermore, the implementation of embodiments of the invention or a described development is possible by way of a computer-readable storage medium, on which a computer program which executes embodiments of the invention or the development is stored.

Embodiments of the invention and/or every described development can also be implemented by a computer program product which has a storage medium on which a computer program is stored which executes embodiments of the invention and/or the development.

According to embodiments of the invention, provision is made for the state observer to be a multi-variable state observer which has a Kalman filter designed for linear-quadratic state feedback (LQG multi-variable state observer).

A multi-variable state observer can be understood to mean state observer, in which—on the basis of a plurality of input variables—a plurality of state variables can be observed or estimated simultaneously, wherein a clear assignment from the (plurality of) input variables to the (plurality of) state variables is dispensed with. All input and state variables are linked to one another (in the multi-variable state observer), as a result of which physical couplings between the individual variables are accounted for.

The terms "estimate", "calculate" and "establish" are used synonymously in the following text in the context of the state observer.

The multi-variable state observer is based on a Kalman filter. This Kalman filter is designed for linear-quadratic state feedback. The interaction between the linear-quadratic state feedback and the Kalman filter is referred to as an LQG (linear quadratic Gaussian) algorithm.

Expressed differently, the design of the Kalman filter in the "LQG multi-variable state observer" can be traced back via the concept of the duality to the design of a "linear quadratic regulator" (LQR). This design is based on the solution of matrix Riccati differential equations.

That is to say, the LQR is a (state) controller, the parameters of which can be determined in such a way that a quality criterion for the closed-loop control quality is optimized.

In order to calculate a controller matrix, a feedback matrix of the LQR can be converted into a set of scalar equations, the so-called matrix Riccati equations.

These matrix Riccati equations emerge from ideal linear quadratic control problems on a continuous time interval that is unbounded on one side if these problems are tackled, as is the case here, using a "feedback" approach, i.e. with (state) feedback.

These matrix Riccati equations are then solved in the design of the Kalman filter for the "LQG multi-variable state observer".

Thus—with the "LQG multi-variable state observer" thereof—embodiments of the invention implements a simple approach for being able to simultaneously observe/estimate a plurality of states of a highly complicated technical process, as is the case in a steam generator of a thermal power plant, wherein all process-technical couplings (between the variables/state variables) can be taken into account during such a (steam generation) process (by/in a single state observer).

The multi-variable state observer can thus combine (a plurality of) individual observers and thus replace these (by a single one). In particular, if an individual observer is to "be combined"—to form the LQG multi-variable state observer—have similar structures, as in the "LQG" approach, the combination thereof is particularly simple.

As a result, embodiments of the invention reduce computation time requirements, computation modules and storage requirements, which therefore is also accompanied by a significant reduction in costs.

Moreover, the "LQG multi-variable state observer" according to embodiments of the invention includes the advantages which (firstly) are offered by an "LQG" approach, i.e. the value quality thereof, the robustness thereof and the low outlay for startup, in a multi-variable state observation—with secondly the advantages thereof, such as the simultaneous "observation" of coupled state variables—or said former advantages are "transferred" thereto.

In particular, non-measurable medium states, such as temperature, pressure and/or enthalpy of a medium or of the steam along/above a steam generator, in particular over an evaporator and/or over a (multi-stage) superheater, in a thermal power plant can be established or "estimated" by means of the state observer ("state observer").

Moreover, it is also possible to estimate disturbances or disturbance variables—defined as further (process) states—with the aid of the state observer ("disturbance variable observer").

By way of example, in this case, such disturbance variables can be both actual disturbance variables in the steam generator, such as a variable heat flow which is transmitted by the flue gas, and further variables not explicitly modeled, such as the injection mass flow rates or an output mass flow rate. Moreover, a/the state observer can also be used to estimate states which, although they can be measured, have inaccuracies in the measurement thereof.

This (state/disturbance variable) observer can—by way of a model of a plant/system, such as a steam generator model, underlying said observer—then observe or estimate the state variables and/or the disturbance variables of the system/plant with the aid of (in this case real) measurement data, such as e.g. input and/or output variables in the system/plant or in the steam generator.

If embodiments of the invention or the "LQG" multi-variable state observer according to embodiments of the invention can thus generate state/disturbance variables for a steam generator of a thermal power plant, these can then be compared with (real) measured variables, such as, in particular, "only imprecisely measurable measured variables", in the steam generator, as a result of which this measurement data can be validated or the quality thereof can be determined.

That is to say, embodiments of the invention in this case develops an efficient and effective option for validating measured variables of highly complex plants, such as the steam generator of a thermal power plant, and for estimating the quality thereof.

Thus, in a preferred development, provision can be made for the input variables of the state observer to be input and/or output variables in a steam generator of a thermal power plant.

Such input variables of the state observer can be a temperature, a pressure and/or an enthalpy of a medium (feedwater/fresh steam) entering and/or leaving the steam generator, an evaporator of the steam generator and/or a superheater of the steam generator.

Moreover, such input variables of the state observer can be medium mass flow rates of a medium (injection mass flow rates) entering and/or leaving the steam generator, an evaporator of the steam generator and/or a superheater of the steam generator.

Furthermore, such an input variable of the state observer can be a fuel mass flow rate.

According to a further preferred embodiment, provision can thus be made for output variables of the state observer (observed states) to be state and/or disturbance variables in the steam generator.

Such output variables of the state observer can be a temperature, a pressure and/or an enthalpy of a medium passing through the steam generator, an evaporator of the steam generator and/or a superheater of the steam generator.

In addition, such output variables of the state observer can be firing states in the steam generator.

Furthermore, such output variables or such an output variable of the state observer can be injection mass flow rates in the steam generator and/or a heat flow in the steam generator.

Furthermore, such output variables of the state observer can also be the temperature, the pressure and/or the enthalpy of a medium entering and/or leaving the steam generator, an evaporator of the steam generator and/or a superheater of the steam generator.

The input and/or output variables of the state observer can be from a process/plant model, such as from a steam generator model of a steam generator of a thermal power plant, used in the state observer.

Thus, according to one development, provision can be made for the state observer to use a model of the steam generator of the thermal power plant.

The steam generator to be modeled—and therefore the corresponding model as well—can in this case comprise at least one evaporator (part), abbreviated to evaporator, and an (optionally multi-stage, for example a three-, four- or else five-stage) superheater (part), abbreviated to superheater. Optionally, the steam generator can also comprise a heater (part), abbreviated to heater, and/or a boiler—which are then modeled as well.

Particularly preferably, the steam generator can be spatially discretized into a plurality of (mass and/or volume) elements, in particular with a constant volume, in the steam generator model.

Energy and/or mass balances can be set up or solved for the (volume) elements. Moreover, the (volume) elements can be described in each case by an enthalpy (energy storage).

In order to model piping in the steam generator, and thus model a delay of heat transmission from the flue gas to the steam, it is possible in each case to assign an iron mass to the (volume) elements.

The (volume) elements can be coupled to one another via the mass flow rates and the enthalpies.

If such a steam generator model is based on these couplable (volume) elements, this renders it possible to implement an arbitrarily scalable model which can be configured for various constructed steam generators (number and size of the superheaters, number of the injections, multi-strand plants).

In the steam generator model, a pressure p can be modeled by way of a concentrated pressure storage.

Since a heat flow Q(P) of the firing of the steam generator is "only" an internal variable which results from a fuel mass flow rate, the steam generator model can be accordingly expanded by a firing model in this respect.

If the (simple/conventional) Kalman filter assumes a linear system and if models, such as the model of the steam generator, are, however, mostly nonlinear, use can be made of an extended Kalman filter (abbreviated to EKF) in the LQG multi-variable state observer, said EKF representing an extension of the Kalman filter of linear models to nonlinear models.

This extension in the EKF consists of the linearization of the (nonlinear) model, which can be recalculated at each time step, i.e. the model is linearized about the current state thereof.

This extended Kalman filter can thus be used as state/disturbance variable observer or in the multi-variable state observer.

The Kalman filter or the extended Kalman filter can be set by way of two (constant) weighting factors—in the form of weighting matrices.

A first diagonally occupied covariance matrix can specify the covariance of the state noise of the observer model (first weighting matrix). A smaller value can be selected for states that are well-described by model equations. As a result of the higher stochastic deviations, less exactly modeled states and pure disturbance variables can be assigned larger values in the covariance matrix.

The covariance matrix of the measurement noise (second weighting matrix) can likewise be occupied diagonally. Here, large values mean very noisy measurements, and so trust is more likely to be put into prediction by the model. In the case of small values (and therefore more reliable measurements), observer errors can accordingly be corrected more sharply.

In order to set a speed of the multi-variable data observer, the ratio of the two weighting/covariance matrices with respect to one another can be varied, in particular by means of a factor. The weighting of the individual states and measured variables within the matrices can also be trimmed. However, the interplay is complex such that, for reasons of simple parameterizability, tuning by way of the factor can be preferred.

Advantageously, calculations in the context of the multi-variable state observer according to embodiments of the invention are performed by a control and protection system of the thermal power plant. Here, the control and protection system can be a control system which controls the thermal power plant during regular operation thereof.

The description of advantageous embodiments of embodiments of the invention provided up until this point contains numerous features which are reproduced in the individual dependent claims, many of said features being combined in part. However, a person skilled in the art will expediently also consider these features individually and combine these to form expedient further combinations.

In particular, these features are combinable, respectively individually and in any suitable combination, with the device according to embodiments of the invention and/or with a developed device, in particular in accordance with the respective dependent claim.

BRIEF DESCRIPTION

Some of the embodiments will be described in detail, with reference to the following figures, wherein like designations denote like members, wherein:

FIG. 1 shows a schematic diagram of a steam generator (/also steam generator model) in a power plant unit/thermal power plant comprising one evaporator and three superheaters (also controlled system);

FIG. 2 shows a scheme of a multi-variable state control;

FIG. 6 shows a list of variables of a multi-variable state control/controller;

DETAILED DESCRIPTION

Figure 3:
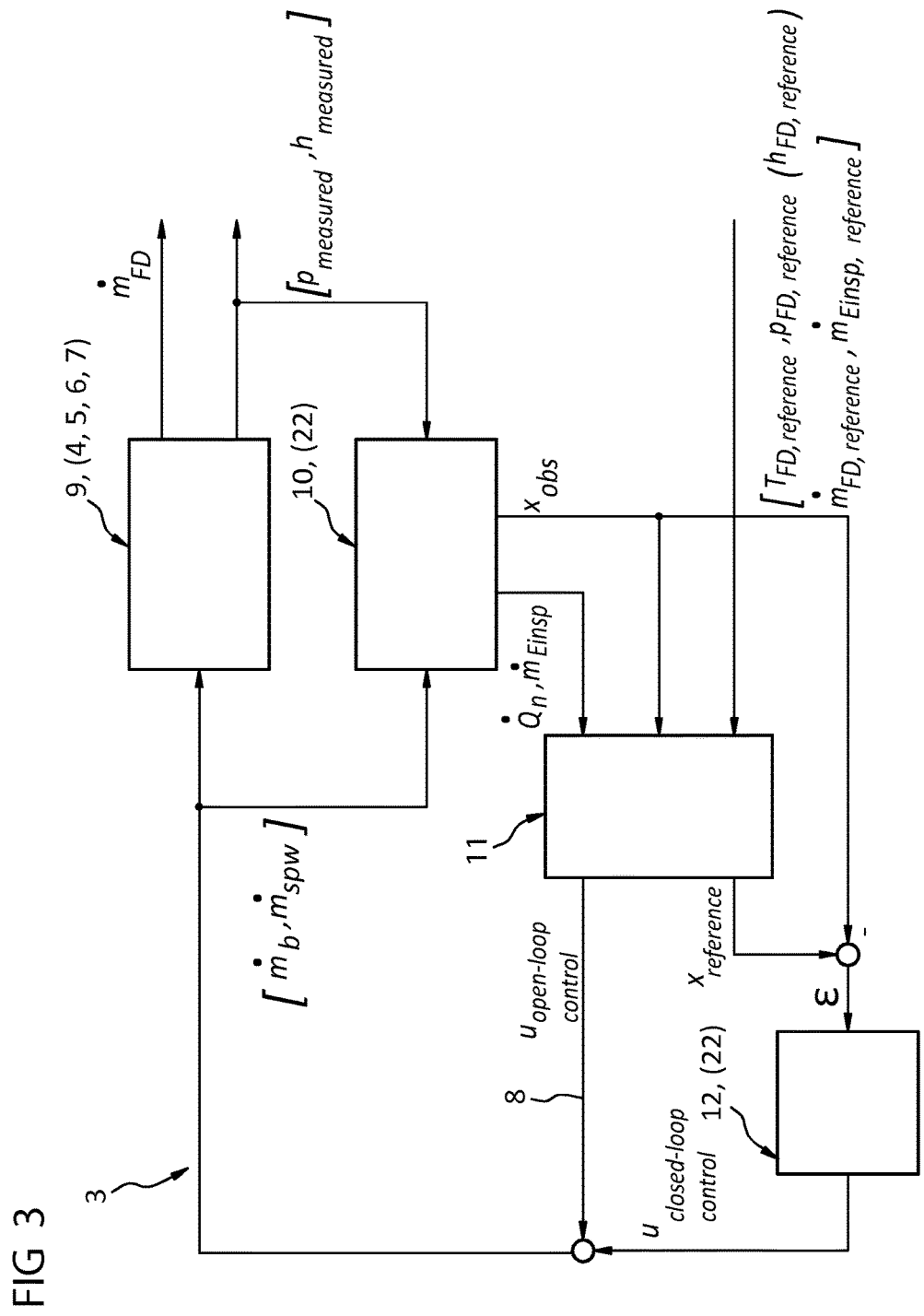
FIG. 3 shows an overall closed-loop control structure of a multi-variable state control/controller with static feedforward control and multi-variable state control, and with an overall system observer (state/disturbance variable observer)

LQG multi-variable state observer in a multi-variable state control for unit closed-loop control of a coal power plant unit Steam Generator Design FIG. 1 shows a schematic illustration of a section of a thermal power plant 2, in this case a coal power plant unit, comprising a steam generator 1 (FIG. 1 is also model illustration of the steam generator 1).

The steam generator 1 consists of an evaporator (VD, 7) and a superheater (UH, 4, 5, 6), in this case a three-stage superheater (referred to for the sake of simplicity as first, second and third superheater (UH1 4, UH2 5, UH3 6) below), comprising two injections (in the second and third superheater, Einsp1/injection 1 15, Einsp2/injection 2 16).

Feedwater (SPW) flows into the evaporator 7 and is evaporated there under the take-up of heat Q. The inflowing feedwater mass flow rate $m(P)_{SPW}$ can be set by means of a control valve (not depicted here).

Furthermore, the (onward flowing) steam (D) is superheated to fresh steam (FD)—by the further take-up of heat Q—in the three superheaters 4, 5, 6 of the steam generator 1 and flows out of the superheaters 4, 5, 6/the third superheater 6 or out of the steam generator 1 $(m(p)_{FD})$.

The take-up or transmission of heat or the level thereof in the evaporator VD 7 or in the superheaters 4, 5, 6 is adjustable by way of the fuel mass flow rate $(m(P)_b)$.

Subsequently, after emerging from the superheaters 4, 5, 6/the third superheater 6 or the steam generator 1, the fresh steam (FD) is fed to the steam turbine (not depicted here).

By means of two injection coolers 15, 16, water is injected into the steam—in the second and third superheater 5, 6—and thus cools said steam. The amount of water injected in the respective (second or third) superheater 5, 6 (injection rate/rates of mass flow, $m(P)_{Einsp1\ or\ 2}$) is set by a corresponding control valve (not depicted here).

In the following text, the steam (downstream of the evaporator 7 and) upstream of the superheaters 4, 5, 6/the first superheater 4 is referred to as steam (D) and the steam downstream of the superheaters 4, 5, 6/the third superheater 6 is referred to as fresh steam (FD) for the purposes of a better distinction only (upstream of the evaporator 7, the medium is feedwater (SPW)), wherein the fact that in the embodiment described below is naturally also applicable to steam which may possibly not be referred to as fresh steam is highlighted.

Temperature sensors (not depicted here) and pressure sensors (not depicted here) measure the temperatures $T_{SPW}$, $T_{VD}$ and pressures $p_{SPW}$, $p_{VD}$ of the feedwater and of the steam upstream and downstream of the evaporator 7. A temperature sensor (not depicted here) and a pressure sensor (not depicted here) measure the fresh steam temperature $T_{FD}$ and the fresh steam pressure $p_{FD}$ of the steam downstream of the superheaters 4, 5, 6. A sensor (not depicted here) measures the feedwater mass flow rate $m(P)_{SPW}$.

Enthalpy values h can be calculated from the temperature value and the pressure value with the aid of the water/steam table such that this sensor system can also indirectly "measure" the feedwater enthalpy or evaporator input enthalpy $h_{SPW}$ and the fresh steam enthalpy or superheater output enthalpy $h_{FD}$.

The evaporator 7 can comprise a preheater (not depicted here). However, this is irrelevant to embodiments of the invention and, in the following, the term "evaporator" is also understood to mean a system consisting of an evaporator with a preheater.

Unit Closed Loop Control

Figure 8:
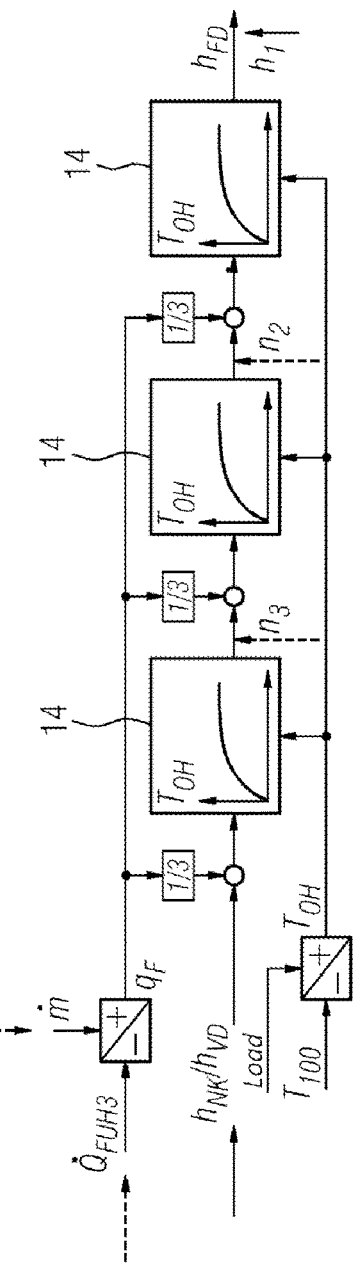
FIG. 8 shows a temperature controller/superheater output temperature controller with measured and observed (dashed) variables (control engineering process model)
Figure 9:
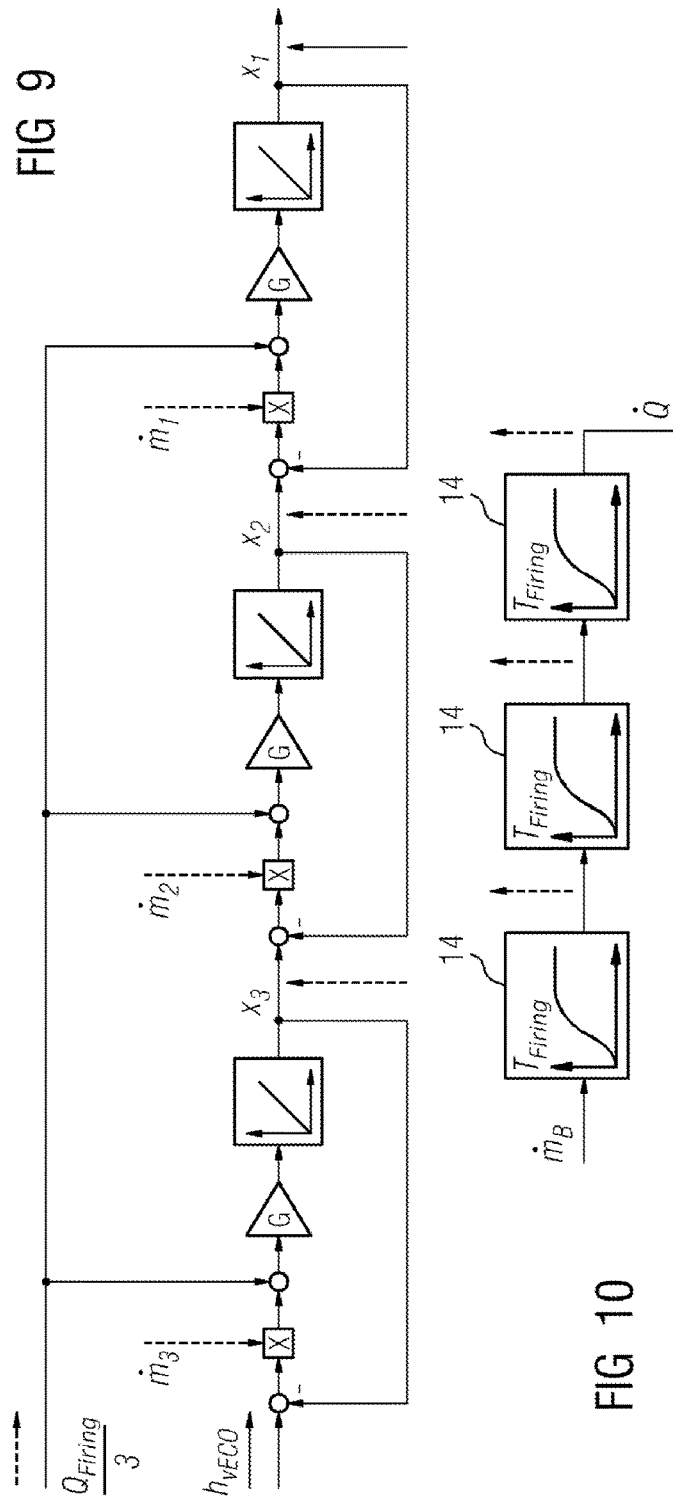
FIG. 9 shows an evaporator output enthalpy controller with measured and observed (dashed) variables (control engineering process model)
Figure 10:
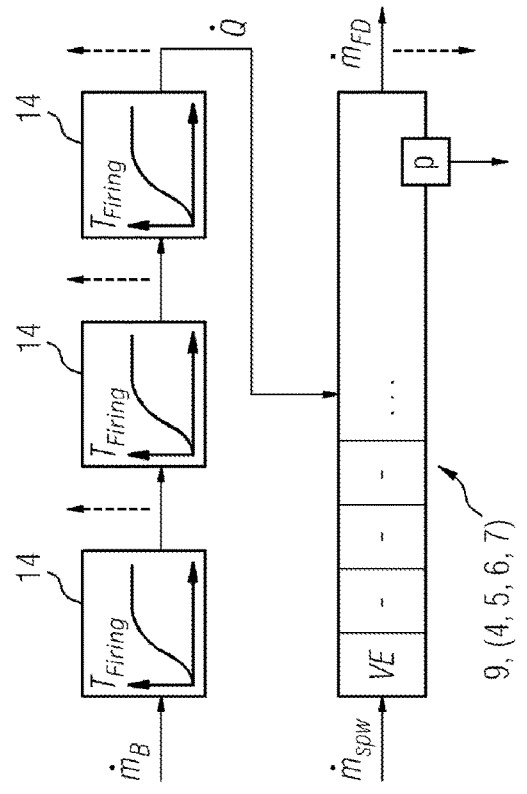
FIG. 10 shows a fresh steam pressure controller with measured and observed (dashed) variables (control engineering process model)

The unit closed loop control in the coal power plant unit is brought about by means of a multi-variable state control 3, which comprises the control loops: fresh steam pressure, evaporator output enthalpy and superheater output temperatures (via the injections) (cf. FIGS. 8 to 10).

FIG. 2 shows a principle of this multi-variable state controller 3 with the controlled and manipulated variables thereof.

In this multi-variable state controller (MIMO) 3, the state or controlled variables: fresh steam pressure $p_{FD}$, evaporator output enthalpy $h_{VD}$ and superheater output temperatures $T_{UH1/2/3}$ are controlled simultaneously, wherein a clear assignment from the manipulated variables: fuel mass flow rate $m(P)_b$, superheater injection mass flow rates $m(P)_{i,UH2/UH3}$ and feedwater mass flow rate $m(P)_{SPW}$ to the controlled variables: fresh steam pressure, evaporator output enthalpy and superheater output temperatures is dispensed with.

All manipulated and controlled variables are linked (in the multi-variable state controller 3) to one another (by the respective control error), as a result of which physical couplings between individual closed-loop controls (SISO, fresh steam pressure control, evaporator output enthalpy control and superheater output temperature control) are accounted for.

As is also elucidated by FIG. 2, the multi-variable state controller 3 is a linear quadratic controller or "linear quadratic regulator" (LQR). That is to say, the feedback matrix of the multi-variable state controller is established in such a way that it has the control quality of a linear quadratic controller.

Such a linear quadratic controller or "linear quadratic regulator" (LQR) is a (state) controller, the parameters of which can be determined in such a way that a quality criterion for the control quality is optimized.

Here, the quality criterion for linear quadratic closed-loop control also considers the relationship of the variables: the manipulated variable u and the controlled variable y. Here, priorities can be determined by the $Q_y$ and R matrices. The quality value J is determined according to:

$$J(x_0, u(t)) = \int_0^\infty (y'(t)Q_y y(t) + u'(t)Ru(t))dt.$$

The static optimization problem in this respect, which is solved by the linear quadratic closed-loop control, is as follows (with K as controller matrix and $x_0$ as initial state):

$$\min_{u(t)} J(x_0, u(t)) = \min_{u(t)=-Kx(t)} J(x_0, u(t)) = \min_K J(x_0, -Kx(t)).$$

In order to calculate the controller matrix, the feedback matrix of the LQR is converted into a set of scalar equations, into so-called matrix Riccati equations, in the multi-variable state control 3 and solved.

These matrix Riccati equations emerge from ideal linear quadratic control problems on a continuous time interval that is unbounded on one side if these problems are tackled, as is the case here, using a "feedback" approach, i.e. with (state) feedback.

FIG. 3 shows the overall closed-loop control structure of the multi-variable state control/controller 3 with its components: steam generator/steam generator model 9, overall system observer (state/disturbance variable observer) 10, central reference value default 11 and (the actual) multi-variable state controller (in this case abbreviated to only state controller 12).

In the following text, the following nomenclature also denotes used variables:

Measured variables are denoted by the nomenclature "measured", reference values are denoted by the nomenclature "reference", open-loop controlled variables are denoted by the nomenclature "open-loop control", closed-loop controlled variables are denoted by the nomenclature "closed-loop control" and observer variables are denoted by the nomenclature "obs". Fuel is represented by "b", "SPW" denotes feedwater, "FD" denotes fresh steam, "p" represents pressure, "h" represents enthalpy, "m" represents mass, "Q" represents heat and "T" represents temperature. Flows are denoted by (P).

FIG. 6 also lists used variables for the overall closed-loop control structure of the multi-variable state control/controller 3.

Figure 4:
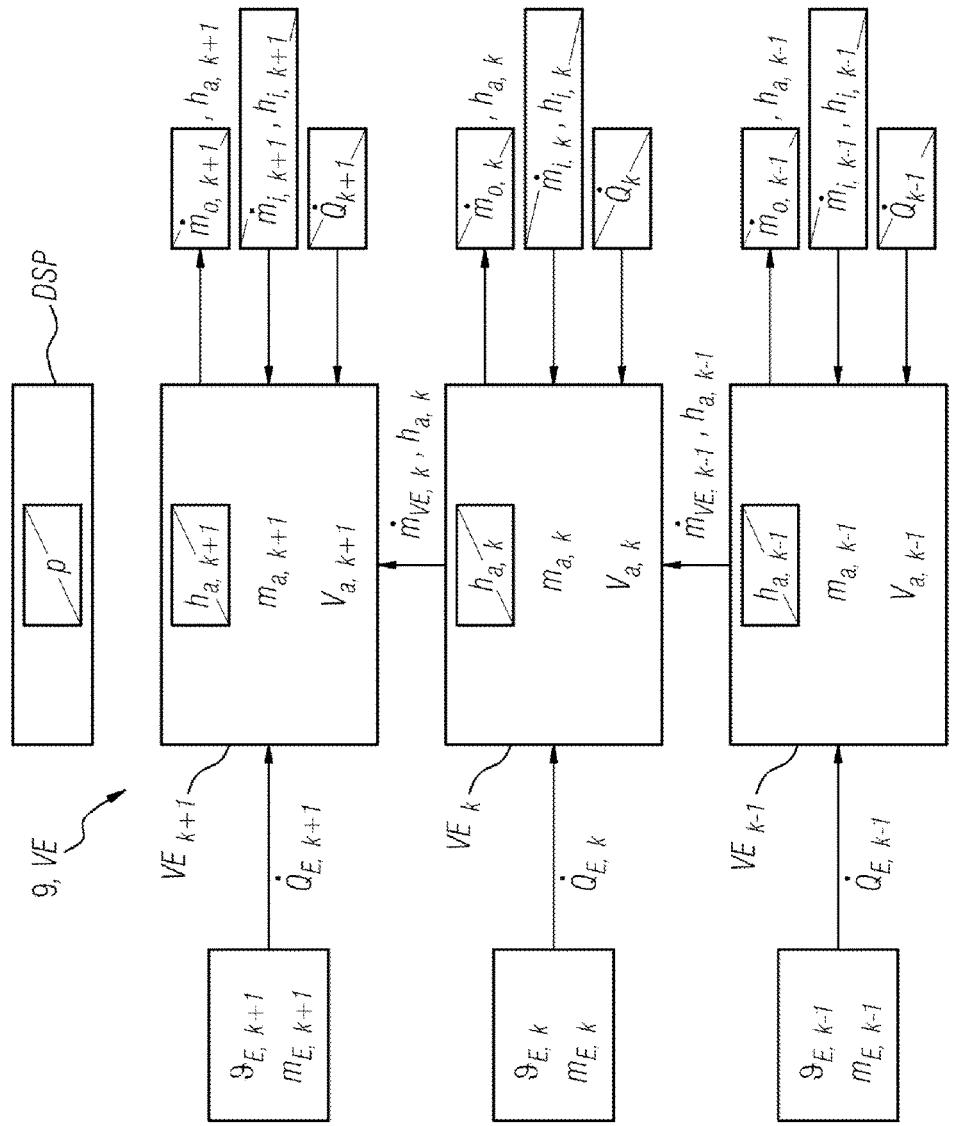
FIG. 4 shows a schematic diagram of a steam generator model.

Steam Generator Model 9 (FIG. 1, FIG. 4)

The steam generator model 9, the installation-technical (model) structure of which is elucidated by FIG. 1, is based on a spatial discretization of the steam generator 1 (made of the evaporator 7 and the three superheaters 4, 5, 6) into elements with a constant volume (denoted below by "VE" for volume elements) and a concentrated pressure storage DSP.

FIG. 4 elucidates this "VE/DSP" setup of the steam generator model 9. Input variables and state variables in the steam generator model 9 or in the volume elements VE and the pressure storage DSP are denoted by opposing slashes (input variables (\), state variables (/)).

A VE with the index k consists of an energy storage, described by the enthalpy $h_{a,k}$. Moreover, it is defined by the mass $m_{a,k}$ and the volume $V_{a,k}$ thereof.

For the sake of simplicity, "flows" in the state variables/input variables are denoted by (P) or by the dot thereover.

The input variables are the external heat supply $Q(P)_k$ by the flue gas, the mass flows $m(P)_{i,k}$ flowing in from the outside and $m(P)_{o,k}$ flowing out to the outside and the specific enthalpy $h_{i,k}$ of the mass flow $m(P)_{i,k}$.

Enthalpy values can be calculated with the aid of the water/steam table from the temperature value and the pressure value.

In order to represent the piping, and hence the delay in the heat transfer from the flue gas to the steam, an iron mass is assigned to each VE. The iron masses are denoted by the temperature $T_{E,k}$ and the mass $m_{E,k}$ thereof.

However, these are not further state variables of the steam generator model 9, but they can be included in the calculation as auxiliary variables.

The heat flow which acts from the iron masses onto the steam is denoted by $Q(P)_{E,k}$. Therefore, the enthalpy of each VE is additionally dependent on $Q(P)_{E,k}$.

The pressure p is modeled by the concentrated pressure storage DSP. The VEs are coupled to one another by way of the mass flows $m(P)_{VE,k}$ and the enthalpies $h_{a,k}$: thus, in the case of n VEs, there are n+1 states (pressure and enthalpies) and n−1 mass flows between individual VEs.

First of all, the model equations of the steam generator model 9, set up by the mass and energy balances which are set up for the volume elements VEs, are specified below; these subsequently being converted into a matrix representation.

Model Equations

From the mass balance of a volume element VE with the mass $m_{a,k}$:

$$\frac{dm_{a,k}}{dt} = m(P)_{VE,k-1} - m(P)_{VE,k} + m(P)_{i,k} - m(P)_{o,k}$$

and of the energy balance for a volume element VE:

$$\frac{dh_{a,k}}{dt} = \frac{1}{m_{a,k}+a_k}\left(h_{a,k-1}m(P)_{VE,k-1} - h_{a,k}m(P)_{VE,k} + h_{i,k}m(P)_{i,k} - h_{a,k}m(P)_{o,k} - h_{a,k}\frac{dm_{a,k}}{dt} + Q(P)_k\right),$$

the following emerges for the state equation for each volume element VE:

$$\frac{dp}{dt} =$$

-continued $$\left(\frac{\partial m_{a,k-1}}{\partial p}\right)^{-1}\cdot\left(-m(P)_{VE,k-1} + m(P)_{i,k-1} - m(P)_{o,k-1} - \frac{\partial m_{a,k-1}}{\partial h_{a,k-1}}\frac{dh_{a,k-1}}{dt}\right)$$

$$\frac{dp}{dt} = \left(\frac{\partial m_{a,k}}{\partial p}\right)^{-1}\cdot$$

$$\left(-m(P)_{VE,k-1} - m(P)_{VE,k} + m(P)_{i,k} - m(P)_{o,k} - \frac{\partial m_{a,k}}{\partial h_{a,k}}\frac{dh_{a,k}}{dt}\right)$$

$$\frac{dp}{dt} = \left(\frac{\partial m_{a,k+1}}{\partial p}\right)^{-1}\cdot\left(m(P)_{VE,k} + m(P)_{i,k+1} - m(P)_{o,k+1} - \frac{\partial m_{a,k+1}}{\partial h_{a,k+1}}\frac{dh_{a,k+1}}{dt}\right),$$

wherein the unknown variables in the mass and energy balance are the mass flows between the VEs: $m(P)_{VE,k-1}$ and $m(P)_{VE,k}$, which can be determined by way of the pressure dependence of the masses stored in the VE with the aid of the water/steam table.

What emerges from this in the case of three volume elements is three equations for three unknowns, specifically the two mass flows between the VEs and the time derivative of the pressure.

Hence, all variables are determined uniquely.

What follows from the model equations is that the steam generator model 9 is scalable as desired. This means that the steam generator model 9 can be configured for differently designed steam generators (number and size of the superheaters, number of injections, multi-stranded plants).

Matrix Representation

Converting the mass balance into matrix representation yields:

$$\frac{dm}{dt} = F_+m(P)_m - F_-m(P)_m + F_im(P)_i - F_0m(P)_0 =$$
$$F_m(P)_m + F_im(P)_i - F_0m(P)_0.$$

Converting the energy balance into matrix representation yields:

$$\frac{d(Hm)}{dt} = H\frac{dm}{dt} + M\frac{dh}{dt}$$
$$= FH_mm(P)_m + F_iH_im(P)_i - F_0H_0m(P)_0 + Q(P) - \alpha\frac{dh}{dt}.$$

From this, the matrix equation of the model can be specified as:

$$\frac{dx}{dt} = D_im(P)_i - D_0m(P)_0 + D_QQ(P)$$

$$D_i = [-C_pB_{pm}^{-1}B_i;\ A_i - A_mC_mB_{pm}^{-1}B_i]$$

$$D_0 = [-C_pB_{pm}^{-1}B_0;\ A_0 - A_mC_mB_{pm}^{-1}B_0]$$

$$D_Q = [-C_pB_{pm}^{-1}B_Q;\ A_Q - A_mC_mB_{pm}^{-1}B_Q]$$

The matrices $D_i$, $D_o$ and $D_Q$ depend on the enthalpies and the pressure, i.e. the states, but neither on the in-flowing and out-flowing mass flows nor on the heat flows. If the variables are combined in a vector, the following emerges for the nonlinear steam generator model 9:

$$\frac{dx}{dt} = G_{nl}(x)u,$$

-continued $$G_{nl}(x) = \lfloor D_i - D_0, D_Q \rfloor,$$

$$u = (m(P)_i, m(P)_0, Q(P)),$$

For the (overall) observer design, the steam generator model 9 must be linearized 17 about the current work point $x_o$, $u_o$. The linearized equations are:

$$\frac{d\Delta x}{dt} = A_{de}\Delta x + B_{de}\Delta u,$$

$$A_{de} = \frac{d(G_{nl}(x)u)}{dx}\bigg|_{x_0,u_0} = \frac{dGnl(x)}{dx}\bigg|_{x_0} \cdot u_0$$

$$B_{de} = \frac{d(G_{nl}(x)u)}{du}\bigg|_{x_0,u_0} = G_{nl}(x_0)$$

Overall System Observer (FIG. 5) 10

Figure 5:
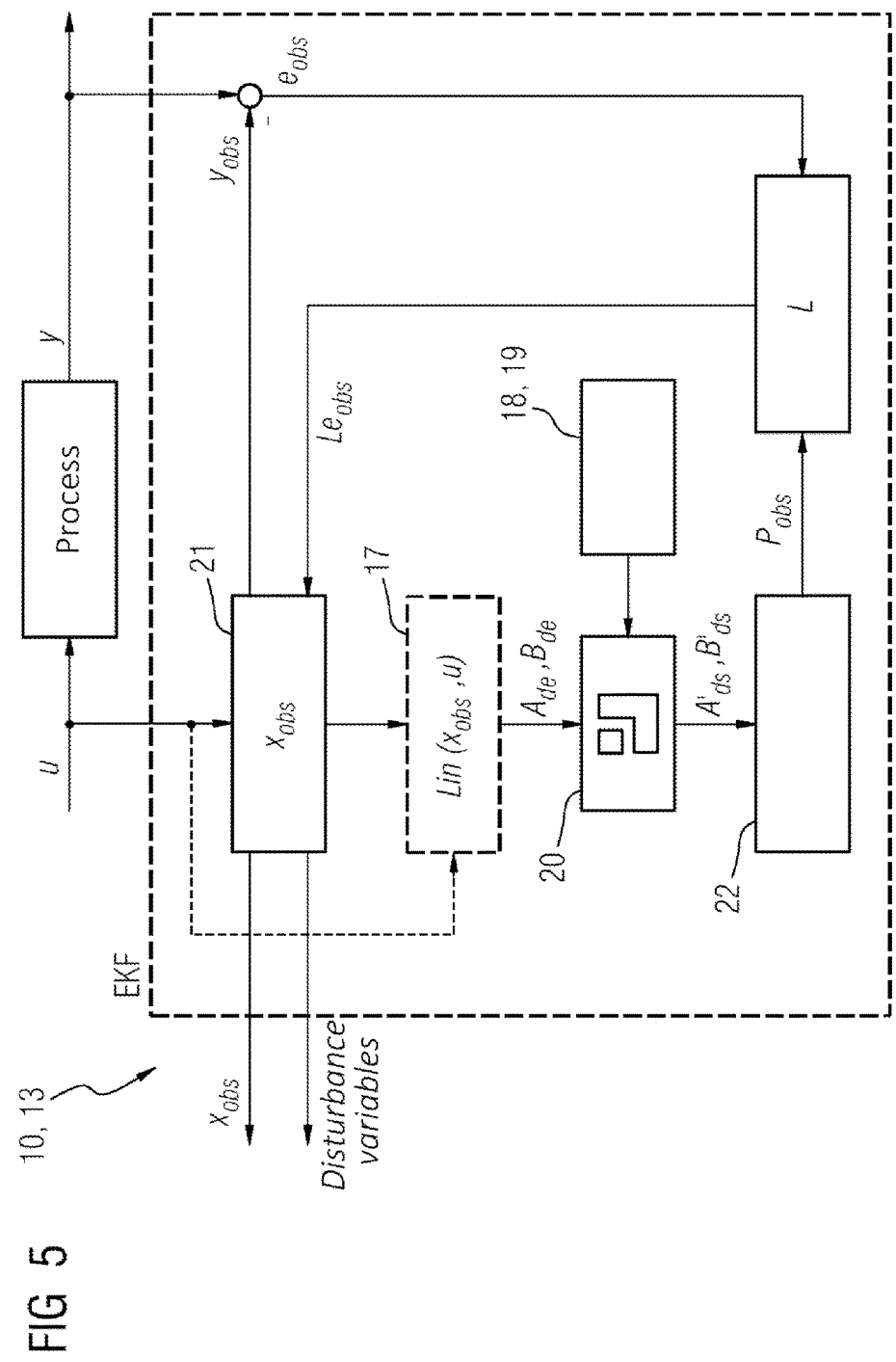
FIG. 5 shows a schematic diagram of an extended Kalman filter as an overall system observer.

FIG. 5 elucidates the extended Kalman filter (EKF) 13 used as state and disturbance variable observer 10 (overall system observer; also abbreviated as observer 10 only).

The (conventional) Kalman filter is a state and disturbance variable observer. The object thereof is to observe or estimate, with the aid of measured data, the state variables and disturbance variables of the system by means of an underlying model.

The conventional Kalman filter assumes a linear system.

However, since the model of the steam generator is nonlinear, an extended Kalman filter 13 is used in the present case.

FIG. 5 shows the setup of the conventional "linear" Kalman filter using full lines; dashed signal paths and blocks symbolize the extension to nonlinear models.

This extension consists in a linearization of the model 17, which is recalculated in each time step; i.e., the (nonlinear) model 21 is linearized 17 about the current state thereof. Expressed differently, the observer approach is based upon a nonlinear observer 21, which is linearized 17 about the work point at each time step and thus supplies the system matrices for the observer 10 and the closed-loop controller 3 and 12.

The input variables of the EKF 13 are the measured input and output variables of the system. The state and disturbance variables output by the observer 10 are: firing ($x_{firing}$), pressure (p), enthalpy (h)—state variables; injections $(m(P)_{Einsp}$, fresh steam mass flow $(m(P)_{FD})$, heat flow $(Q(P)_n)$—disturbance variables).

As shown in FIG. 5, the observer model ($A_{ds}'$, $B_{as}'$) 20 is formed from the linearized model 17 ($A_{de}$, $B_{de}$), the firing model 18 and the disturbance variable model 19.

The observer gain L is calculated on the basis of this observer model 20.

By means of this observer gain L, the observer errors $e_{obs}$, i.e. deviations between measured data and model outputs, are applied to the nonlinear model 17.

These applied correction terms $Le_{obs}$ consist, firstly, of corrections of the states of the nonlinear model and, secondly, of the estimated disturbance variables which act on the model.

Deviations between the model and the real process are compensated for by this application.

The design of a Kalman filter can be traced back to the design of an LQR by way of the concept of duality. This design is based on the solution of the matrix Riccati differential equation 22:

$$-\frac{dP_{obs}}{dt} = A_{ds}'P_{obs} + P_{obs}A_{ds} - P_{obs}B_{ds}R_{obs}^{-1}B_{ds}'P_{obs} + Q_{obs},$$

where L emerges from the solution $P_{obs}$ in accordance with:

$$L = (R_{obs}^{-1}B_{ds}'P_{obs})'.$$

The described steam generator model 9 (cf. FIG. 1) is used in the observer 10.

Since the heat flow Q(P) is only an internal variable and results from the fuel mass flow $m(P)_b$, the steam generator model 9 must be extended accordingly in this respect.

Figure 7:
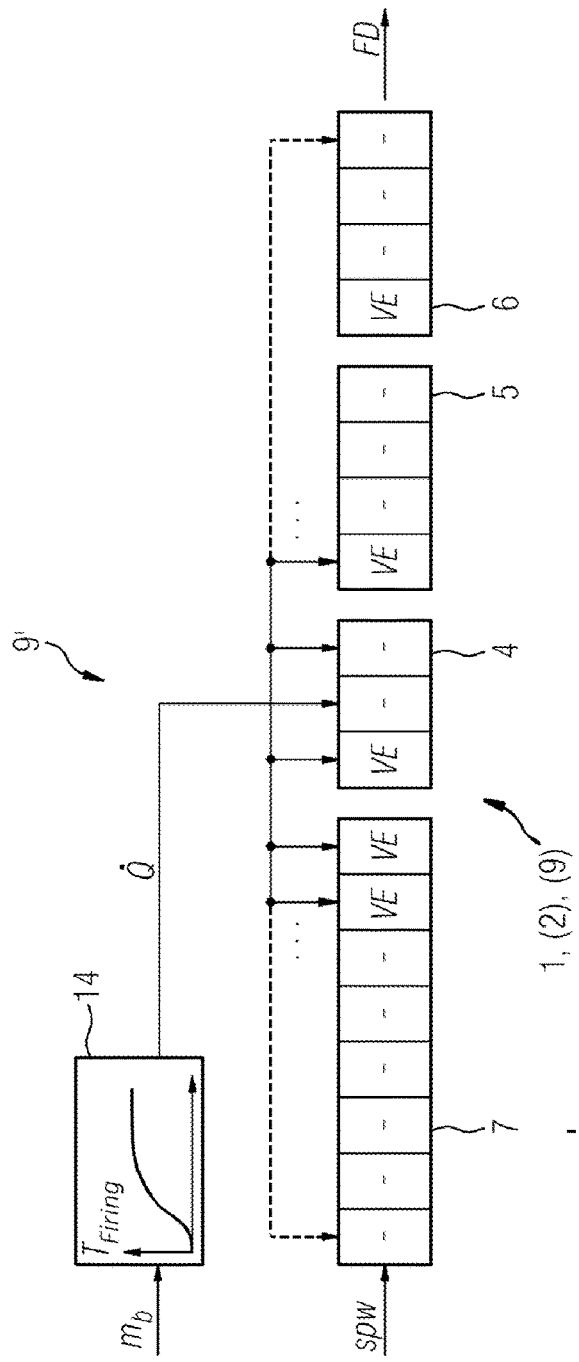
FIG. 7 shows an extended steam generator model with coal burning.

FIG. 7 shows the steam generator model 9' extended in this respect.

The coal combustion and heat release, i.e. the transfer behavior from the fuel mass flow $m(P)_b$ to the heat flow Q(P), are described by a third order delay element 14 with the time constant $T_{firing}$.

The output of the actual PT3 element 14 is a scalar variable, but it is distributed amongst the individual VEs by way of a constant distribution matrix $Q_0$.

The firing model 18 or the differential equation of the PT3 element 14 is as follows:

$$\frac{dx_{firing}}{dt} = \frac{1}{T_{firing}}\begin{pmatrix} -1 & 1 & 0 \\ 0 & -1 & 1 \\ 0 & 0 & -1 \end{pmatrix} \cdot x_{firing} + \begin{pmatrix} 0 \\ 0 \\ \frac{1}{T_{firing}} \end{pmatrix} \cdot \dot{m}_b$$

$$\dot{Q} = Q_0(1 \ 0 \ 0) \cdot x_{firing},$$

where the states of the PT3 element are denoted by $x_{firing}$ (firing) in this case.

The state vector in the observer 10 is consequently extended by $x_{firing}$ and has the following setup:

$$x_{obs} = \begin{pmatrix} x_{firing} \\ p \\ h \end{pmatrix},$$

where:

$x_{firing} \in \Re^{3 \times 1}$ $p \in \Re^{1 \times 1}$ $h \in \Re^{n \times 1}$.

In addition to the state observation, the EKF 13 serves as disturbance variable observer.

Here, both actual disturbance variables, such as the variable heat flow transferred by the flue gas, and further variables not explicitly modeled count as disturbance variables. Here, this applies to the injected mass flows. Although injected mass flows are measured, an estimate by the EKF 13 is preferred in this case due to the lack of accuracy. The same applies to the output mass flow $m(P)_{FD}$, which is likewise estimated.

The observed state variables and the estimated disturbance variables are, simultaneously, the output variables of the observer 10.

The diagonally occupied covariance matrix $Q_{obs}$ specifies the covariance of the state noise of the observer model. A small value is selected for states that are well-described by the model equations. States that are modeled less exactly and pure disturbance variables are assigned higher values in the covariance matrix due to the higher stochastic deviations.

The covariance matrix of the measurement noise $R_{obs}$ is likewise occupied diagonally. Large values mean very noisy measurements, and so trust is more likely to be put into prediction by the model. In the case of small values (and therefore reliable measurements), observer errors can accordingly be corrected more sharply.

Here, the entries of $Q_{obs}$ and $R_{obs}$ are themselves diagonal matrices in each case, the dimensions of which depend on the number of states or the number of temperature measurement points.

In order to set the speed of the observer 10, the ratio of the covariance matrices to one another is varied by the factor $\alpha_{obs}$. In theory, the weightings of the individual states and measured variables within the matrices can also be trimmed. However, the interplay is complex such that, for reasons of simple parameterizability, tuning should be carried out only by way of the factor $\alpha_{obs}$.

Figure 11:
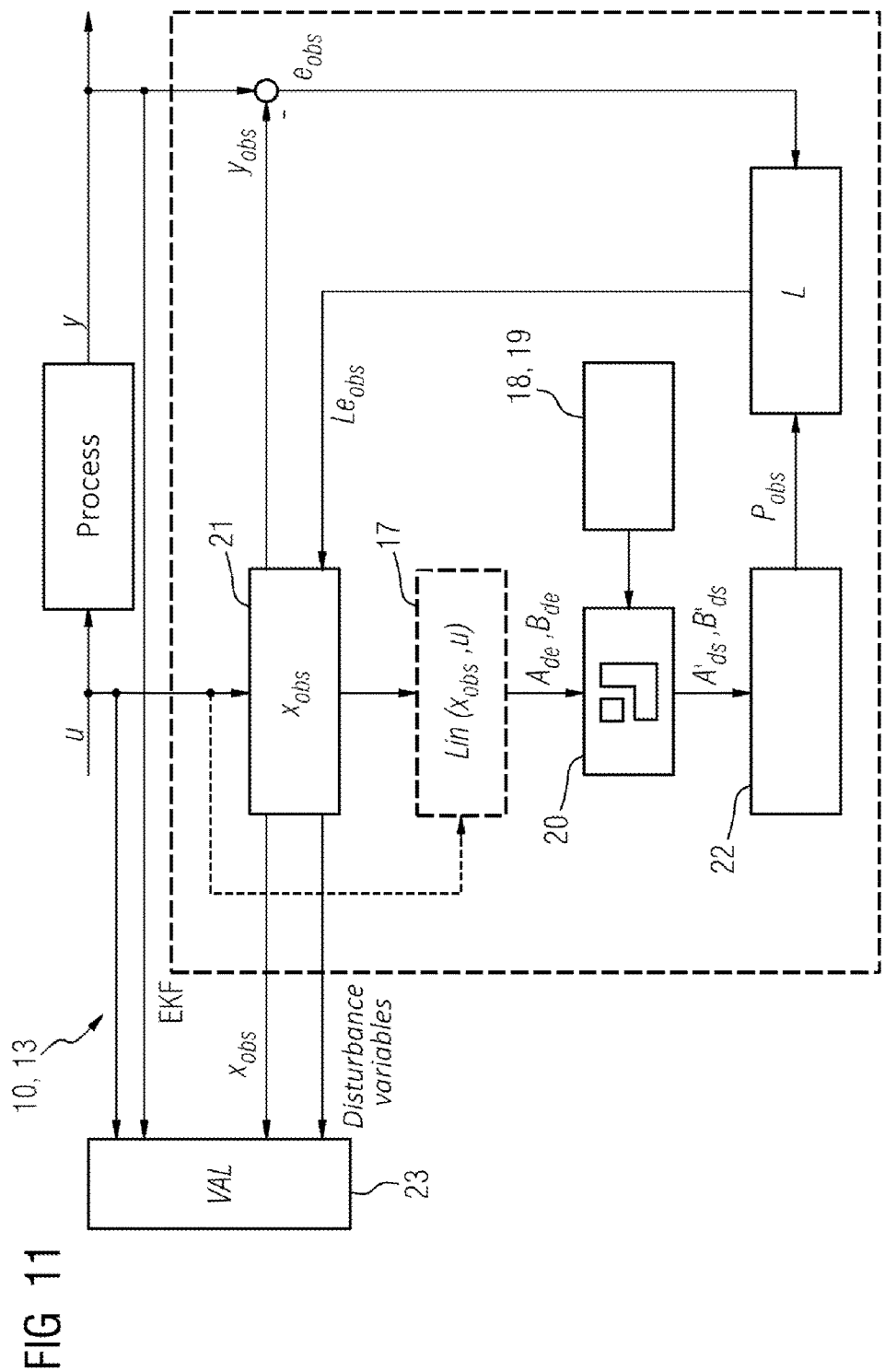
FIG. 11 shows a schematic diagram for elucidating a validation of measured variables in a steam generator using an extended Kalman filter as overall system observer.

Beyond estimating the state variables/disturbance variables, the overall observer 10 is, as elucidated by FIG. 11, also used for validating VAL 23 measured variables in the steam generator 1.

To this end, as shown in FIG. 11, the measured variables of the steam generator 1 and the state and disturbance variables established by the overall observer 10 are supplied to a validation process 23, within the scope of which the measured variables are compared with the state and disturbance variables.

This provides information about the quality of the measured values of the steam generator 1.

Multi-Variable State Controller 3 (Cf. FIG. 2) Concept

The closed-loop control concept of the multi-variable state controller 3 (FIG. 2) is based on concepts of individual LQG observer controllers of/for the fresh steam pressure, evaporator output enthalpy and (via the injections) (cf. FIGS. 8 to 10) superheater output temperature individual controls, which were extended appropriately to the present multi-variable system (the overall observer 10 is put in place of the observers of the individual LQR observer controllers).

The controlled variables are fresh steam pressure, evaporator output enthalpy and superheater output temperatures.

The power (or the fresh steam mass flow) is controlled by the turbine valve, which is assumed to be ideal. Therefore, the fresh steam mass flow is predetermined and hence an input variable of the system.

In addition to the fuel mass flow and the feedwater mass flow, a plurality of injections (into the superheaters 5, 6) serve as manipulated variables. Moreover, for the injection mass flows there exists a reference value which is intended to be maintained in the stationary state.

Individual controls (fresh steam pressure, evaporator output enthalpy and superheater output temperatures (via the injections) (cf. FIGS. 8 to 10)

Superheater Output Temperature Controller/(Abbreviated) Temperature Controller (FIG. 8)

In a cascaded structure of temperature control (superheater output temperature control), the temperature controller generates, as shown by FIG. 8, the reference value for the underlying closed-loop control of the injection cooling of each superheater stage.

The temperature controller operates using enthalpy variables, and so, initially, it is necessary to calculate these (to the extent that these are measured/measurable, otherwise by the observer) from the measured/observed temperature values and the associated pressures with the aid of a water/steam table.

For the observer estimate, the steam enthalpy is reconstructed at three points in the superheater 4, 5, 6 by the observer (where the length of the superheater is spatially divided into three).

FIG. 8 shows the temperature controller (closed-loop control-technical process model (with controller elements 14)), wherein the observed variables used by the temperature controller are marked by dashes.

The steam enthalpy after the injection cooling $h_{NK}$ and after the evaporator $h_{VD}$ and also the output enthalpy $h_{FD}$ (or $h_1$) are still available as measured variables; the intermediate variables $h_2$ and $h_3$ are variables estimated by the observer.

However, there is a difference in respect of the thermal output of the flue gas $q_F$. It is not determined as a specific variable by the observer, but as an absolute value. However, since the temperature controller expects a specific variable, the value must initially be calculated with the aid of the mass flows m(P) between the volume elements VE, which mass flows are likewise observed.

Evaporator Output Enthalpy Controller/(Abbreviated) Enthalpy Controller (FIG. 9)

The enthalpy controller has the object of controlling the enthalpy at the evaporator output to a reference value with the aid of the feedwater mass flow.

Analogously to the temperature controller, the enthalpy controller requires the enthalpy values at three points in the evaporator 7. In addition to the measured value at the evaporator output, the existing observer reconstructs the values of the enthalpy at ⅓ and ⅔ of the length of the evaporator 7.

So that the overall system observer 10 of the multi-variable state control 3 also knows the corresponding enthalpy values, the model must be parameterized with multiples of three states (i.e. volume elements).

FIG. 9 shows the closed-loop control-technical process model of the enthalpy controller, wherein the observed variables used thereby are marked by dashes.

The input and output enthalpies $h_{vECO}$ and $x_1$ are available to the controller as measured variables; the intermediate enthalpies $x_2$ and $x_3$ and the mass flows $m(P)_1$, $m(P)_2$, $m(P)_3$ are estimated by the observer.

Fresh Steam Pressure Controller/(Abbreviated) Pressure Controller (FIG. 10)

The fuel mass flow $m(P)_b$ serves as manipulated variable for controlling the fresh steam pressure. The fresh steam mass flow $m(P)_{FD}$ guided onto the turbine acts as a disturbance variable on the pressure.

The dynamics of converting fuel into thermal output is represented by third order delay elements 14.

FIG. 10 shows the closed-loop control-technical process model of the pressure controller, wherein the observed variables used thereby are marked by dashes.

These individual LQG observer state controllers are adapted in such a way that these can be simulated by the overall system observer 10 instead of their dedicated observer. Only relatively small modifications are required since these are based on comparable models.

The closed-loop control concept of the multi-variable state controller 3 provides a controller consisting of two independent modules, namely the static pre-controller 8 and the (actual) multi-variable state controller 12 (abbreviated to state controller 12 only below) (cf. FIG. 3).

In this manner, the advantages of the state control in respect of compensating for disturbances are combined with the stationary accuracy of conventional PI control.

Pre-Control 8/Central Reference Value Default 11

As elucidated by FIG. 3, the central reference value default 11 satisfies two objects.

Firstly, it consists of a static guide and disturbance variable application. This generates the manipulated variables ($u_{open-loop\ control}$), which bring 8 the system into the reference state, on the basis of the guide variables and the observer outputs.

Secondly, the associated reference value is calculated for each state of the model, once again on the basis of the guide variables and the estimated disturbance variables. These reference values comprise the states of the firing model, the pressure and the enthalpies of the volume elements. These reference values are required for the reference value/actual value compensation in the state control 12.

In conclusion, the following outputs therefore emerge from the central reference value default 11:

$$u_{open-loop\ control} = \begin{bmatrix} \dot{m}_{b,open-loop\ control} \\ \dot{m}_{i,open-loop\ control} \end{bmatrix},$$

$$x_{reference} = \begin{bmatrix} x_{f,reference} \\ p_{reference} \\ h_{reference} \end{bmatrix},$$

where:

$\dot{m}_{b,open-loop\ control} \in \mathfrak{R}^{1\times 1}$, $\dot{m}_{i,open-loop\ control} \in \mathfrak{R}^{i\times 1}$, $x_{f,reference} \in \mathfrak{R}^{3\times 1}$, $p_{reference} \in \mathfrak{R}^{1\times 1}$, $h_{reference} \in \mathfrak{R}^{n\times 1}$.

The reference values or the control components are in this case calculated on the basis of the model equations. All mass flows between the volume elements VE and the feedwater mass flow emerge from the (given) fresh steam mass flow and the reference values for the injection mass flows. This is described in the following equation (in the following, the dimensions of the matrices are specified in part):

$$\begin{bmatrix} F & F_i(:,1) \end{bmatrix}_{n\times n} \cdot \begin{bmatrix} \dot{m}_m \\ \dot{m}_{Spw} \end{bmatrix}_{n\times 1} = [F_o \quad -F_i(:,2:end)]_{n\times(o+i-1)} \cdot \begin{bmatrix} \dot{m}_o \\ \dot{m}_{Einsp,reference} \end{bmatrix}_{(o+i-1)\times 1}.$$

From this, the enthalpy reference values of all VEs can be calculated with the aid of the estimated heat flows Q(P). To this end, the mass flows are initially brought into matrix form:

$$\underbrace{M*}_{n\times n} = \underbrace{F \cdot M_m \cdot F'}_{(n\times m)(m\times m)(m\times n)} - \underbrace{F_o \cdot \dot{m}_o \cdot F'_o}_{(n\times o)(o\times o)(o\times n)},$$

whereby all enthalpy reference values (hreference) can be calculated using the enthalpy balance:

$$\begin{bmatrix} \underbrace{M*(:,1:end-1)}_{n\times(n-1)} & \underbrace{\dot{Q}}_{n\times 1} \end{bmatrix} \cdot \begin{bmatrix} h_{reference}(1:end-1) \\ \hat{x}_{f,reference} \end{bmatrix}_{n\times 1} = \begin{bmatrix} \underbrace{-M*(:,end)}_{n\times 1} \cdot \underbrace{h_{FD,reference}}_{1\times 1} - \underbrace{\begin{bmatrix} F_i \end{bmatrix}}_{n\times i} \cdot \left( \underbrace{\dot{m}_{i,reference}}_{i\times 1} \bullet \underbrace{h_i}_{i\times 1} \right) \end{bmatrix}.$$

Consequently, the enthalpy reference values emerge as:

$$h_{reference} = \begin{bmatrix} h_{reference}(1:end-1) \\ \underbrace{h_{FD,reference}}_{n\times 1} \end{bmatrix}.$$

The reference value for the pressure ($p_{reference}$) is predetermined from the outside and therefore does not need to be calculated. The three states of the firing model 18 have the same reference value in the stationary case, and so the following applies:

$$x_{f,reference} = \hat{x}_{f,reference} \cdot x_{f,obs} \cdot \begin{bmatrix} 1 \\ 1 \\ 1 \end{bmatrix}.$$

The control components are the calculated input mass flows m(P)$_{Spw}$ and (P)$_{i,reference}$. For the fuel mass flow, the control component equals the reference value of the firing model 18 multiplied by the observed output of the firing model 18:

$$\dot{m}_{i,open-loop\ control} = \begin{bmatrix} \dot{m}_{Spw} \\ \underbrace{\dot{m}_{i,reference}}_{i\times 1} \end{bmatrix},$$

$$\dot{m}_{b,open-loop\ control} = \hat{x}_{f,reference} \cdot x_{f,obs}.$$

State Controller 12

In the case of a perfect model and an undisturbed system, the central reference value default 11 would be sufficient. However, since this is not the case, the pre-control 8 is, as shown in FIG. 3, complemented by the (actual) multi-variable state controller 12 (also abbreviated to state controller 12 only below).

FIG. 3 shows the interconnection thereof with the steam generator model 9, the overall system observer 10 and the central reference value default 11.

The reference values of the states are balanced with the observed states and the control errors is formed thereby. Consequently, the control error is not a scalar variable, as is the case in e.g. conventional PI control, but a vector variable.

As elucidated by FIG. 3, manipulated variables ($u_{closed-loop\ control}$) are calculated from this vector, which manipulated variables are applied to the control components in an additive manner. Here, control law consists of a weighted sum of the control errors ε in accordance with the following equation:

$$u_{closed-loop\ control} = -K'\varepsilon$$

where $K \in \mathfrak{R}^{(3+1+n)\times(1+1+i-1)}$ $u_{closed-loop\ control} \in \mathfrak{R}^{(1+i)\times(1)}$.

Here, the control gain K is calculated by solving an optimization problem, in which a compromise is found between high control quality and low manipulation complexity. In this optimization problem, a quality functional satisfying the following equation is minimized:

$$J = \int_0^\infty (x'Q_{lqr}x + u'R_{lqr}u)dt$$

The state controller 12 is parameterized by two weighting matrices $Q_{lqr}$ and $R_{lqr}$.

The two weighting matrices $Q_{lqr}$ and $R_{lqr}$ are components of a square quality functional. The controller 12 or the feedback matrix K is the result of an optimization problem, in which a compromise is found between control quality and manipulation complexity. Here, $Q_{lqr}$ evaluates the control quality and $R_{lqr}$ evaluates the manipulation complexity.

A stronger weighting of $Q_{lqr}$ (smaller weighting of $R_{lqr}$) accordingly leads to smaller square deviations of the actual state values from the reference values. However, this is bought by an increased manipulation complexity. Conversely, smaller values of $Q_{lqr}$ lead to worse control quality but, at the same time, a smoother manipulated variable profile is also achieved.

The weighting matrices are diagonal matrices, the dimensions of which correspond to the number of state variables or the number of manipulated variables. The order of magnitude of the state variables (or manipulated variables) also plays a role when selecting the weightings in the non-normalized case. In principle, all weightings are selectable individually; however, the weightings within one system section (e.g. evaporator 7) are expediently evaluated the same.

In a manner analogous to the observer design, a matrix Riccati differential equation is also solved here (22):

$$-\frac{dP_{lqr}}{dt} = A'P_{lqr} + P_{lqr}A - P_{lqr}BR_{lqr}^{-1}B'P_{lqr} + Q_{lqr}$$

The solution renders it possible to determine the controller gain K $$K' = R_{lqr}^{-1}B'P_{lqr}$$

where $P_{lqr}$ is the solution of the matrix Riccati differential equation.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

LIST OF REFERENCE SIGNS

1 Steam generator
2 Thermal power plant
3 Multi-variable state controller/control, LQR multi-variable state controller
4 (First) superheater
5 (Second) superheater
6 (Third) superheater
7 Evaporator
8 Static pre-control
9 (Spatially discretized) steam generator model
9' Extended steam generator model (from (9))
10 (Overall) observer, state/disturbance variable observer, LQG multi-variable state observer
11 Central reference value default
12 State control (in (3))
13 Kalman filter, extended Kalman filter
14 Controller, control element, third-order delay element, PT3 element
15 (First) injection
16 (Second) injection
17 Linearization (about a work point), linearized model
18 Firing model
19 Disturbance variable model
20 Observer model
21 Linear Kalman filter, linear model/observer
22 Riccati solver
23 (Measured variable) validation
DSP Pressure storage
VE Volume element
VAL Validation
L Observer gain
[/] State variable
[\] Input variable
P Process

The invention claimed is:

1. A state observer of a steam generator of a thermal power plant, wherein:
the state observer is a multi-variable state observer which has a Kalman filter designed for linear-quadratic state feedback; and
the state observer is configured to:
estimate state and disturbance variables in the steam generator with aid of measurement data derived from input and output variables in the steam generator, at least one of said input and output variables comprising temperature, pressure and enthalpy of a medium entering and leaving a component of said steam generator;
simultaneously collect measured state and disturbance variables from data including said input and output variables of the steam generator;
compare the measured state and disturbance variables with the estimated state and disturbance variables; and
in response to comparing the measured state and disturbance variables to the estimated state and disturbance variables,
validate the measured state and disturbance variables based on the comparison, else
identify inaccuracies associated with the measured state and disturbance variables;
wherein the state observer derives a vector variable control error signal which is delivered to a multi-variable state controller, and wherein manipulated and controlled variables are linked in the multi-variable state controller to one another by the control error signal.

2. The state observer as claimed in claim 1, wherein the Kalman filter is an extended Kalman filter which is a linearized model of said Kalman filter with applied correction terms being supplied to said Kalman filter, said applied correction terms comprising corrections of states of a non-linear model and of estimated disturbance variables which act on the non-linear model.

3. The state observer as claimed in claim 1, wherein the state observer uses a spatially discretized steam generator model of the steam generator of the thermal power plant including a plurality of constant volume elements.

4. The state observer as claimed in claim 3, wherein at least one of energy and mass balances are set in the spatially discretized steam generator model by way of discretized volume elements of the spatially discretized steam generator model.

5. The state observer as claimed in claim 1, wherein input variables of the state observer are at least one of the input variables and the output variables of the steam generator.

6. The state observer as claimed in claim 5, wherein the input variables of the state observer further include medium mass flow rates of at least one of a medium entering and leaving at least one the steam generator, an evaporator of the steam generator, and a superheater of the steam generator, and fuel mass flow rate.

7. The state observer as claimed in claim 1, wherein output variables of the state observer are the measured state and disturbance variables of the steam generator.

8. The state observer as claimed in claim 7, wherein the output variables of the state observer further include at least one of injection mass flow rates in the steam generator, temperature, pressure, enthalpy of at least one of a medium entering and leaving at least one of the steam generator, an evaporator of the steam generator, and a superheater of the steam generator, and a rate of heat flow in the steam generator.

* * * * *